United States Patent
Kim et al.

(10) Patent No.: US 9,438,967 B2
(45) Date of Patent: Sep. 6, 2016

(54) DISPLAY APPARATUS AND CONTROL METHOD THEREOF

(71) Applicants: Chi-won Kim, Uijeongbu-si (KR); Kun-done Pi, Seongnam-si (KR)

(72) Inventors: Chi-won Kim, Uijeongbu-si (KR); Kun-done Pi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/088,518

(22) Filed: Nov. 25, 2013

(65) Prior Publication Data

US 2015/0150048 A1 May 28, 2015

(51) Int. Cl.
*H04N 21/8405* (2011.01)
*H04N 21/4788* (2011.01)
*H04N 21/472* (2011.01)
*H04N 21/482* (2011.01)
*H04N 21/81* (2011.01)
(Continued)

(52) U.S. Cl.
CPC ...... *H04N 21/8405* (2013.01); *H04N 21/4622* (2013.01); *H04N 21/4788* (2013.01); *H04N 21/47202* (2013.01); *H04N 21/47205* (2013.01); *H04N 21/4828* (2013.01); *H04N 21/8133* (2013.01); *H04N 21/8173* (2013.01); *H04N 21/25891* (2013.01); *H04N 21/4532* (2013.01)

(58) Field of Classification Search
CPC .......... G06F 17/3089; H04N 21/8405; H04N 21/4622; H04N 21/47202; H04N 21/47205; H04N 21/8133

USPC .................................. 725/110, 93; 726/12, 7
See application file for complete search history.

(56) References Cited

U.S. PATENT DOCUMENTS 6,631,523 B1 * 10/2003 Matthews et al. ............... 725/53
7,237,252 B2 * 6/2007 Billmaier ......................... 725/43
(Continued)

FOREIGN PATENT DOCUMENTS

EP     1 898 325 A1     8/2007
EP     2 518 618 A1     10/2012
(Continued)

OTHER PUBLICATIONS

Communication dated Apr. 11, 2014, issued by the European Patent Office in counterpart European Application No. 13194315.1.
(Continued)

*Primary Examiner* — Nathan Flynn
*Assistant Examiner* — Caroline Somera
(74) *Attorney, Agent, or Firm* — Sughrue Mion, PLLC (57) ABSTRACT

A display apparatus is provided. The display apparatus includes a signal reception configured to receive an image signal of content; a signal processor configured to process the image signal received by the signal reception according to a preset image processing process; a display configured to display a content image based on the image signal processed by the signal processor; a communicator configured to with a plurality of servers respectively providing a plurality of services related to the content; and a controller configured to display a keyword over the content image which is related to the content image displayed on the display, changing identifiers of the services related to the content on the display based on a preset user input with respect to the keyword being displayed, and being provided with the service related to the content based on the keyword from a server which corresponds to a selected identifier through selective input of the identifiers.

16 Claims, 10 Drawing Sheets

(51) Int. Cl.
*H04N 21/462* (2011.01)
*H04N 21/258* (2011.01)
*H04N 21/45* (2011.01)

(56) References Cited

U.S. PATENT DOCUMENTS

| | | | |
|---|---|---|---|
| 7,712,123 B2 | 5/2010 | Miyaoku et al. | |
| 8,291,451 B2* | 10/2012 | Roberts et al. | 725/40 |
| 8,479,225 B2* | 7/2013 | Covell et al. | 725/18 |
| 9,118,864 B2* | 8/2015 | Sirpal | H04N 5/44 |
| 2002/0042920 A1* | 4/2002 | Thomas et al. | 725/87 |
| 2002/0147984 A1* | 10/2002 | Tomsen et al. | 725/109 |
| 2007/0240179 A1* | 10/2007 | Lavigne | 725/14 |
| 2009/0113475 A1* | 4/2009 | Li | 725/39 |
| 2009/0164460 A1 | 6/2009 | Jung et al. | |
| 2010/0005492 A1 | 1/2010 | Takano et al. | |
| 2010/0162164 A1 | 6/2010 | Kwon et al. | |
| 2011/0276567 A1* | 11/2011 | Asikainen et al. | 707/728 |
| 2012/0054794 A1* | 3/2012 | Kim | G06F 3/0346 725/38 |
| 2012/0114233 A1* | 5/2012 | Gunatilake | 382/165 |
| 2013/0198642 A1* | 8/2013 | Carney et al. | 715/738 |
| 2014/0053209 A1* | 2/2014 | Young | H04N 21/42203 725/53 |
| 2014/0310746 A1* | 10/2014 | Larsen et al. | 725/37 |
| 2015/0007234 A1* | 1/2015 | Rasanen et al. | 725/45 |
| 2015/0106850 A1* | 4/2015 | Ellis | H04N 5/44543 725/43 |

FOREIGN PATENT DOCUMENTS

| | | |
|---|---|---|
| KR | 10-0566794 B1 | 4/2006 |
| KR | 10-2011-0129715 A | 12/2011 |
| KR | 10-2012-0081412 A | 7/2012 |
| WO | 2012/014130 A1 | 2/2012 |

OTHER PUBLICATIONS

Communication dated Mar. 5, 2014, issued by the International Searching Authority in counterpart International Application No. PCT/KR2013/010251.

* cited by examiner

DISPLAY APPARATUS AND CONTROL METHOD THEREOF

CROSS-REFERENCE TO RELATED APPLICATION

This application claims priority from Korean Patent Application No. 10-2012-0142032, filed on Dec. 7, 2012 in the Korean Intellectual Property Office, the disclosure of which is incorporated herein by reference, in its entirety.

BACKGROUND

1. Field

Apparatuses and methods consistent with the exemplary embodiments relate to a display apparatus displaying an image based on an image signal and a control method thereof. More particularly, the exemplary embodiments relate to a display apparatus configured to be easily provided with a service related to a content image that a user is watching, and a control method thereof.

2. Description of the Related Art

A display apparatus processes image signals input from external image sources and displays images based on the image signals on a display panel configured as various forms, such as a liquid crystal display (LCD). A display apparatus available to general users is configured as a TV or a monitor. For example, a display apparatus configured as a TV processes broadcast signals transmitted from a broadcasting station by, for example, tuning and decoding, to display images of a user desired broadcast channel or processes image signals received from a content providing device, connected locally or via a network, to display content images.

A display apparatus not only functions to display an image based on an image signal provided from an outside source, but also receives and provides various kinds of information and data from and to different external devices as well as a network server via connection thereto for two-way communications. Recently, there are an increasing number of service providers that build servers and provide a variety of services to the display apparatus. The display apparatus may be provided with various kinds of services, such as a search service or a video service, via connection through communications to the servers of the service providers.

For example, to utilize a search service using a title of a desired content image, a user first displays an image of the search service provided by a server through a web browser or application. The user then manually inputs a keyword of the title into a search box on the image through an input unit, such as a remote controller of the display apparatus. However, such a series of operations may cause inconvenience to the user and may take a relatively substantial amount of time to obtain a search result.

SUMMARY

The foregoing and/or other aspects may be achieved by providing a display apparatus including: a signal reception configured to receive an image signal of content; a signal processor configured to process the image signal received by the signal reception according to a preset image processing process; a display configured to display a content image based on the image signal processed by the signal processor; a communicator configured to communicate with a plurality of servers respectively providing a plurality of services related to the content; and a controller configured to display over the content image a keyword related to the content image displayed on the display, changing identifiers of the services related to the content on display based on a preset user input with the keyword being displayed, and being provided with the service related to the content based on the keyword from a server which corresponds to a selected identifier via selective input of the identifiers.

The display apparatus may further include a user input, wherein the controller may be configured to change a category of the services on display and change any one of the identifiers of the services in the displayed category on display based on a shift instruction received from the user input.

The controller may change the category on display based on one of an up or down instruction and a right or left instruction from the user input and may change the identifier based on the other thereof.

The category of the services related to the content may include at least one of a video on demand (VOD) service, a content search service, a social networking service (SNS), and commerce.

The displayed identifier may include a logo of services provided.

The keyword may be displayed over the content image based on an input through the user input while the content image is being displayed.

The keyword may include a title of the content image.

The controller may obtain at least the keyword from the metadata of the content image.

The communicator may communicate with at least one external device forming a local area communication network, and the controller may obtain user preference information from a record of use of a plurality of content images displayed on the display apparatus over a predetermined period of time and may transmit the user preference information to the external device on a preset cycle so that the external device is provided with the services related to the content, based preference information of the user.

The controller may obtain the user preference information based on a accumulation frequency of metadata of each of the content images.

The metadata of the content image may include at least one of a title of the content image, a genre of the content image, and an actor in the content image.

Another aspect of the exemplary embodiments may be achieved by providing a method of controlling a display apparatus the method including: displaying a content image; displaying a keyword related to the content image over the content image; changing an identifier of each of a plurality of services related to content on display based on a preset user input with the keyword being displayed; and connecting to a server which provides a service related to the content corresponding to a selected identifier via selective input of the identifier and being provided with the service related to the content based on the keyword from the server.

The changing the identifier of each of the services related to the content on display may include receiving a shift instruction from a user input of the display apparatus; and changing a category of the service on display and changing any one of the identifiers of the services in the displayed category on display, the content based on the received shift instruction.

The changing of the identifier on display based on the received shift instruction may include changing the category on display based on one of an up or down instruction and a right or left instruction from the user input and changing the identifier based on the user input.

The category of the services related to the content may include at least one of a video on demand (VOD) service, a content search service, a social networking service (SNS), and commerce.

The displayed identifier may include a logo of services provided.

The keyword may be displayed over the content image based on an input through the user input while the content image is being displayed.

The keyword may include a title of the content image.

The displaying of the keyword may include obtaining at least the keyword from metadata of the content image.

The control method may further including obtaining user preference information from a record of use a plurality of content images displayed on the display apparatus over a predetermined period of time and transmitting the user preference information to at least one external device, forming a local area communication network along with the display apparatus, on a preset cycle, so that the external device is provided with the services related to the content based on the user preference information.

The obtaining of the user preference information may include obtaining the user preference information based on accumulation frequency of metadata of each of the content images.

The metadata of a content image may include at least one of a title of the content image, a genre of the content image and an actor in the content image.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Figure 1:
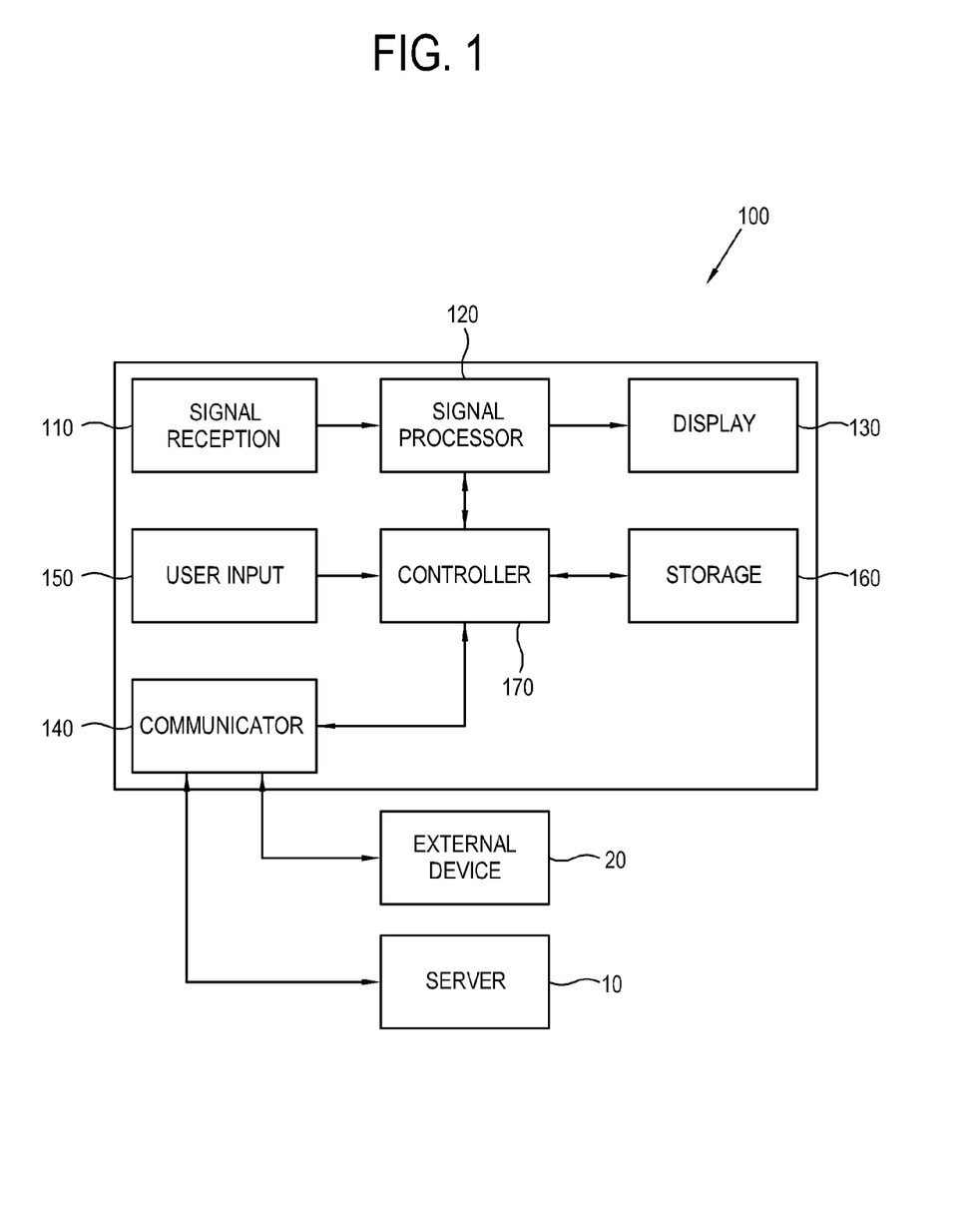
FIG. 1 is a block diagram illustrating a configuration of a display apparatus according to a first exemplary embodiment.

FIG. 1 is a block diagram illustrating a configuration of a display apparatus 100 according to a first exemplary embodiment.

As shown in FIG. 1, the display apparatus 100 according to the exemplary embodiment includes a signal reception 110 configured to receive an image signal from an outside image source (not shown), a signal processor 120 configured to process the image signal received by the signal reception 110 according to a preset image processing process, a display 130 configured to display an image based on the image signal processed by the signal processor 120, interfaces 140 and 150 configured to transmit and receive various signals, data, information, or commands with the display apparatus 100, a storage 160 configured to store various kinds of data information, and a controller 170 configured to control general operations of these components of the display apparatus 100.

The signal reception 110 receives an image signal or image data from an image source (not shown) of a content provider via a cable or wirelessly and transmits the image signal or image data to the signal processor 120. The signal reception unit 110 may be configured as various types of devices based on standards of image signals and configurations of the display apparatus 100. In the exemplary embodiment, the display apparatus 100 is implemented as a TV. When an image signal is a broadcast signal, the signal reception 110 includes a tuner configured to tune the broadcast signal by each channel.

The signal reception 110 may receive an image signal in any method, without being limited to either an analog or digital mode. For example, the signal reception unit 110 may receive a radio frequency (RF) signal transmitted from a broadcasting station or may receive various image signals in accordance with composite video, component video, super video, SCART, high definition multimedia interface (HDMI), DisplayPort, unified display interface (UDI) or wireless HD standards.

The signal processor 120 performs various image processing processes on an image signal transmitted from the signal reception 110. The signal processor 120 outputs a processed image signal to the display 130, thereby displaying an image on the display 130.

The signal processor 120 may perform any kind of image processing, without being limited to, for example, decoding, frame refresh rate conversion, scaling, noise reduction to improve image quality, detail enhancement, or the like. The signal processor 120 may be configured as an image processing board formed by mounting individual chipsets which independently conduct such separate processes or may be formed on an image processing board by an integrated multi-functional system on chip (SOC).

The display 130 displays an image based on an image signal output from the signal processor 120. The display 130 may be configured in various display modes using liquid crystals, plasma, light emitting diodes, organic light emitting diodes, a surface conduction electron emitter, a carbon nano-tube, nano-crystals, or the like.

The display 130 may further include an additional component, depending on a display mode thereof. For example, when a display mode uses liquid crystals, the display 130 may include a liquid crystal display (LCD) panel (not shown), a backlight (not shown) which provides light to the LCE panel, and a panel driving board (not shown) configured to drive the panel.

The interfaces 140 and 150 conduct transmission, reception, or exchange of a signal, data, or information between the display apparatus 100 and, for example, a user, an external device 20, or a server 10 outside the display apparatus 100. The interfaces 140 and 150 include a communicator 140 configured to communicate with the external device 20 or with the server 10 via a local area network or wide area network, according to a preset communication protocol, and a user input 150 which is manipulated by a user and outputs preset information or a preset command which corresponds to a user manipulation to the controller 170.

The communicator 140 performs two-way communication with at least one external device 20 connected locally or via a local area network, or at least one server 10 connected via a wide area network, so as to transmit and receive data. Here, the external device 20 may be implemented as various kinds of electronic devices, for example, a portable media player, a TV, a computer, and a mobile phone.

The user input 150 transmits various control commands preset by user's manipulations and inputs to controller 170, and accordingly the controller 170 conducts a process which corresponds to a command. The user input 150 may be configured as various types of devices, for example, a menu key and an input panel installed on an outside of the display apparatus 100 or as a remote controller separate from the display apparatus 100.

The storage 160 includes a nonvolatile memory which enables reading and writing, such as a flash memory or hard disk drive. The storage 160 is accessed by the controller 170, and data may be read, recorded, revised, deleted or updated by the controller 170.

With this configuration, when the signal reception 110 receives an image signal content provided from the content provider, the signal processor 120 processes the image signal, thereby displaying an image of the content on the display 130.

Apart from the content provider providing content, there is a service provider providing a service which is related to the content. Various kinds of content related services may be provided. For example, the content related services include a video on demand (VOD) service that provides video data related to content so that a user of the display apparatus 100 may view the content at any desired time, a content search service that provides detailed information related to content or relevant information including news, a social networking service (SNS) that includes reviews and opinions of a plurality of users relating to content, and a commerce service enabling the sale/purchase of products.

The service provider is equipped with the server 10 providing such content related services and provides a service which corresponds to a request from the display apparatus 100 connected to the server 10 via communication to the display apparatus 100. The service may be provided by various methods and forms, without being particularly limited.

For example, suppose that the server 10 provides a VOD service. The server 10 includes image data related to various kinds of content and provides a webpage configured to enable retrieval of the included content.

According to a known method, a user executes a web browser or an application on the display apparatus 100 connected to the server 10, via communication, in order to display a webpage image provided by the server 10 and inputs a title of desired content in a keyword box on the webpage image by manipulation of the user input 150. The server 10 retrieves content which corresponds to the input title and transmits image data of the retrieved content to the display apparatus 100. The display apparatus 100 displays an image based on the image data received from the server 10.

Alternatively, when the server 10 provides an SNS service, the server 10 stores data regarding reviews and opinions related to content written by various clients. When a keyword of particular content, for example, a keyword including a title, actor names, or genre of the content, is received, the server 10 retrieves data relevant to the keyword from the stored data and provides the data to the display apparatus 100, to be displayed thereon.

However, in the known method, an operation of displaying a service image for providing a content related service and an operation of manually inputting a keyword on the service image are carried out by the user executing the web browser or application. Thus, the user may be inconvenienced by the manipulation needed to be provided with a service related to desired content through the display apparatus 100.

To overcome such inconvenience, an exemplary embodiment suggests the following method.

While a content image is being displayed on the display 130, the controller 170 displays on the content image a keyword which is relevant to the content image. With the keyword being displayed, the controller 170 changes identifiers of a plurality of content related services on display based on a preset user input. Then, in response to an input for selecting an identifier of one content related service being carried out, the controller 170 is provided with a content related service based on the keyword from the server 10, providing a service which corresponds to the selected identifier.

The keyword related to the content image may be title information related to the content image. The controller 170 may extract title information from metadata of the image signal, and additionally extract a brief description of details of the content image or an index keyword preset in the metadata by the content provider in order to select a keyword related to the content image.

Figure 2:
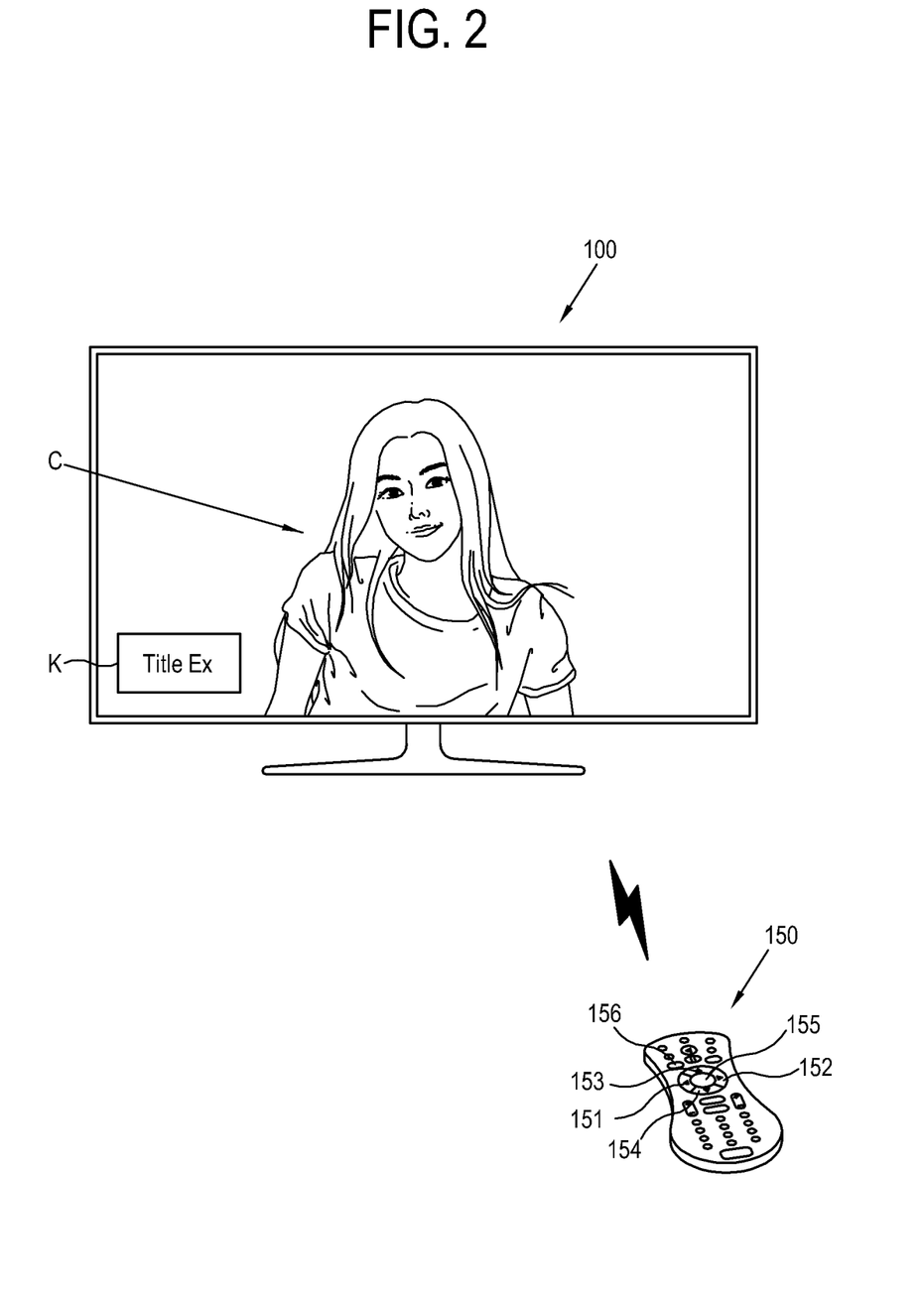
FIG. 2 illustrates a content image and a keyword displayed on the display apparatus of FIG. 1.

FIG. 2 illustrates a content image C and a keyword K being displayed on the display apparatus 100, according to an exemplary embodiment.

As shown in FIG. 2, the display apparatus 100 displays a content image C of particular content. Meanwhile, the user input 150 is configured as a remote controller of the display apparatus 100, which includes a plurality of buttons 151 to 156 including arrow keys 151, 152, 153, and 154 for up, down, right, and left movement manipulated by the user.

When a preset event occurs with the content image C being displayed, the display apparatus 100 displays a keyword K related to the content image C in order to overlap the content image C. The keyword K may be title information related to the content image C. When a title of the content image C is, for example, "TitleEx," the display apparatus 100 displays such a keyword K.

Here, various events may be used for displaying the keyword K. For example, the event may occur by the user clicking a button 156 on the user input 150. Alternatively, the keyword K may be displayed automatically when the content image C is displayed, or the keyword may not be displayed based on a user manipulation through the user input 150.

As described above, when the user performs a preset manipulation through the user input 150 with the keyword K being displayed, an identifier of the content related service is displayed along with the keyword K.

Figure 3:
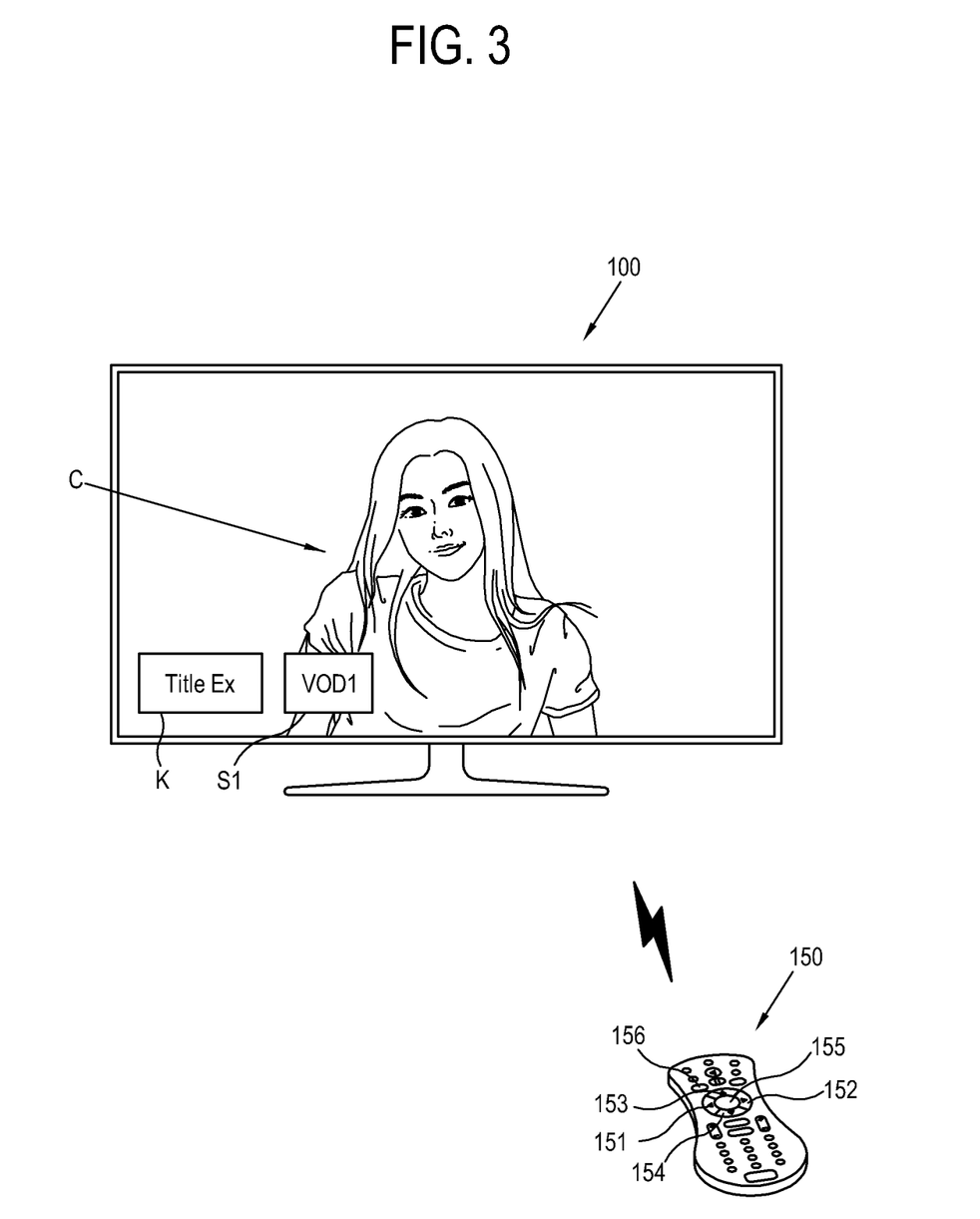
FIGS. 3 and 4 illustrate an identifier of a content related service displayed on the display apparatus of FIG. 1.
Figure 4:
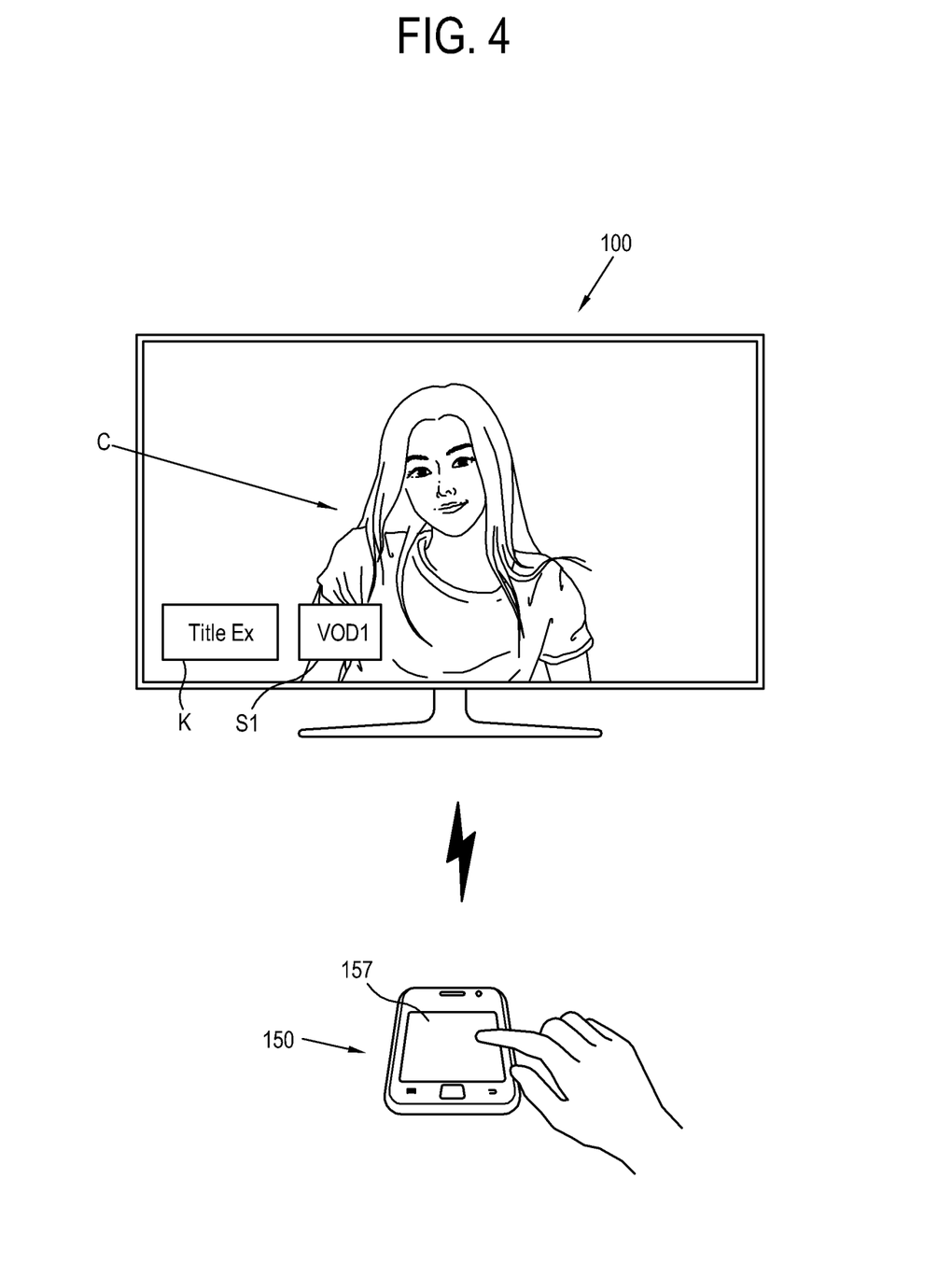

FIGS. 3 and 4 illustrate an identifier S1 of a content related service displayed on the display apparatus 100.

As shown in FIG. 3, the display apparatus 100 is displaying the content image C and the keyword K. Here, when the user transmits a shift command through the user input 150, an identifier S1 of the content related service to possibly be provided to the display apparatus 100 is displayed, along with the keyword K.

The content related service may be provided from the server 10 connected to the display apparatus 100 via a network. The content related service may include various services described above, such as a VOD service, a content search service, and an SNS service, each of which has an identifier to distinguish a provider thereof.

A plurality of service providers may be present to provide equivalent or similar services with respect to a content related service. For example, three service providers "VOD1," "VOD2," and "VOD3" provide a VOD service, two services providers "Srch1" and "Srch2" provide a content search service, and three services providers "SNS1," "SNS2," and "SNS3" provide an SNS service.

When the shift command is received with the keyword K being displayed, the display apparatus 100 displays a default, for example, "VOD1," from the identifier S1 of the content related service. Here, the service identifier S1 may include a service title expressed in a text or a logo of the service.

Here, the shift command may be generated via the arrow keys 151, 152, 153, and 154 of the user input 150.

Alternatively, as shown in FIG. 4, when the user input 150 includes a touch pad 157, the shift command may be generated by a drag motion on the touch pad 157 instead of the four arrow keys 151, 152, 153, and 154.

Also, the identifier S1 may be displayed when clicking a preset button on the user input 150 instead of using the shift command.

As described above, while the identifier S1 is being displayed on the display apparatus 100, the display apparatus 100 may conduct an operation of changing a category of a content related service on display and an operation of changing the identifier S1 of the service provider in a particular category on display which corresponds to a shift instruction, through the user input 150.

For example, when left and right shift instructions are received from the user input 150, the display apparatus changes a service category. Also, when up and down shift instructions are received from the user input 150, the display apparatus 100 changes a service provider in a current category. However, this example is provided for illustrative purposes only. The display apparatus 100 may change a service category based on up and down instructions and may change a service provider in a current category based on right and left instructions.

Figure 5:
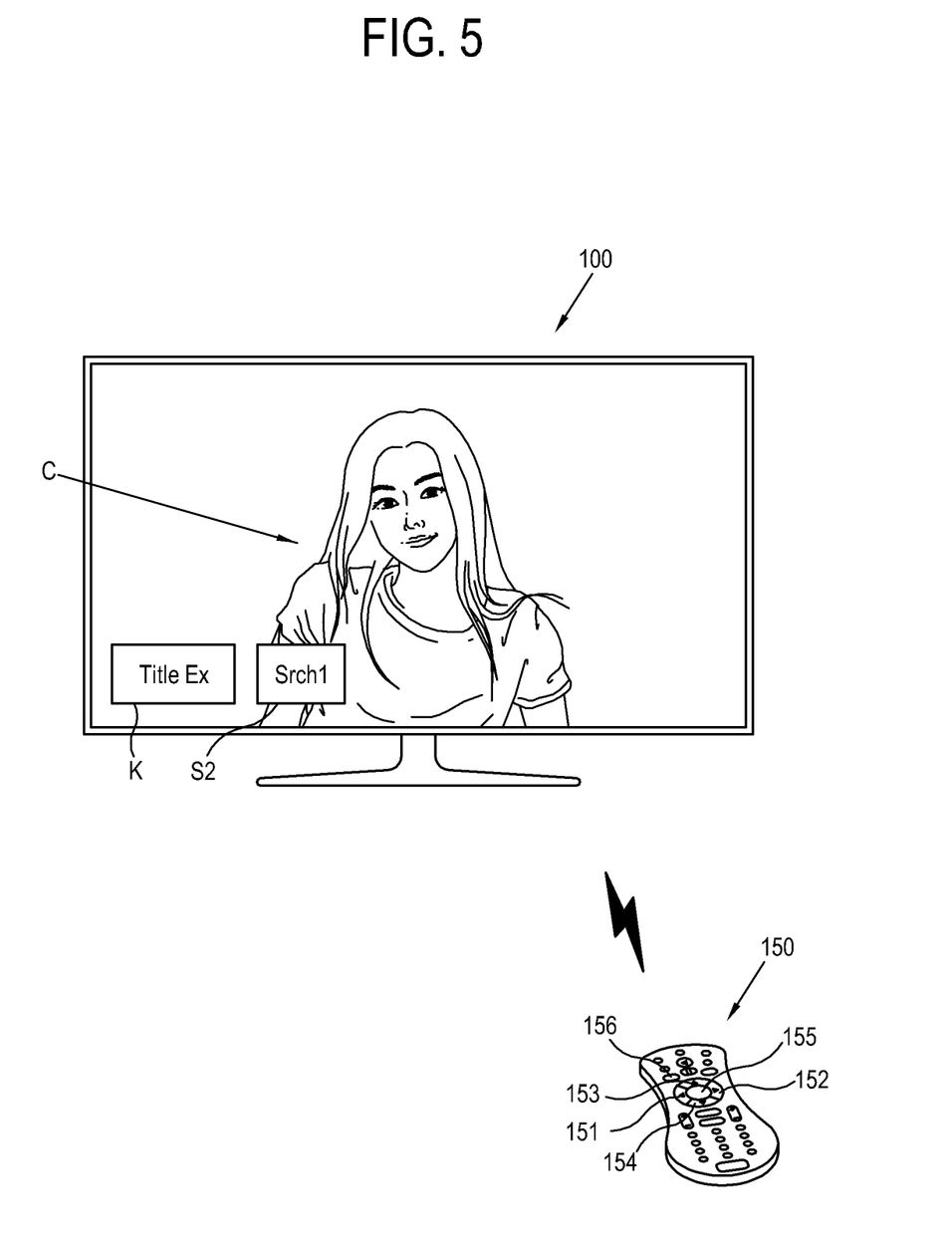
FIGS. 5 and 6 illustrate an identifier of a service provider being changed the display on the display apparatus of FIG. 1.
Figure 6:
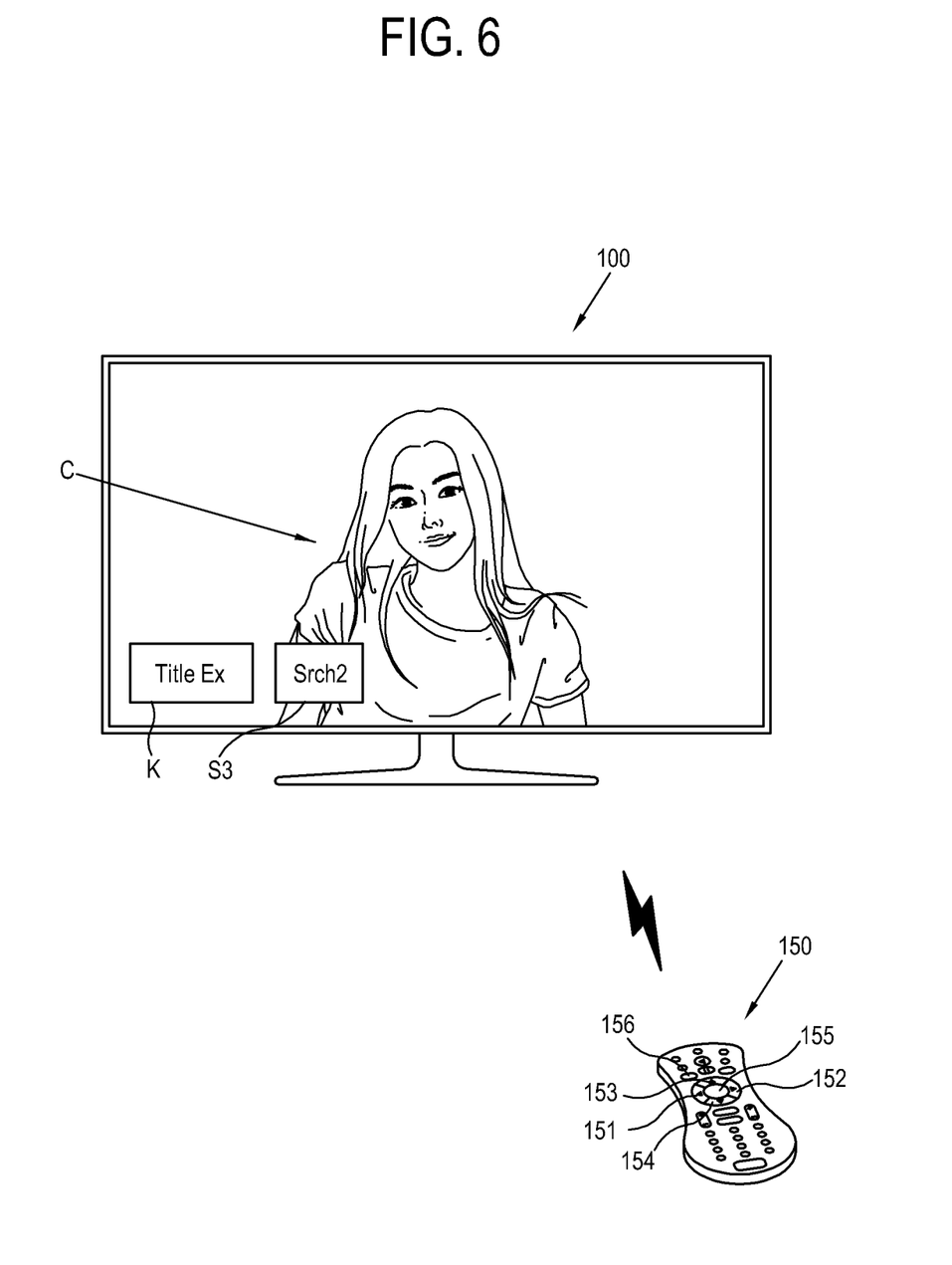

FIGS. 5 and 6 illustrate an identifier of a service provider being changed from S2 to S3 on the display apparatus 100.

In FIG. 4 described above, the display apparatus 100 is displaying the identifier S1 of the service provider "VOD1" in a VOD service category. When a right shift instruction is received from the user input 150, the display apparatus 100 changes the VOD service category to a content search service category.

As shown in FIG. 5, the user clicks a right shift button 152 on the user input 150. Accordingly, the display apparatus 100 receives a right shift instruction from the user input 150.

The display apparatus 100 changes the service category from the VOD service to the content search service based on the right shift instruction and changes to "Srch1" as an identifier S2 of a service provider in the content search service category on display.

In this state, when the right shift instruction is received from the user input 150 again, the display apparatus 100 changes the service category to a subsequent SNS service and changes to "SNS1" as an identifier of a service provider in a SNS service category on display.

Alternatively, when a left shift instruction is received from the user input 150 with "Srch1" is being displayed, the display apparatus 100 changes the service category from the content search service back to the VOD service and changes to "VOD1" as an identification of a service provider in the VOD service category.

When up and down shift instructions are received from the user input 150 with "Srch1" as the identifier in the content search service category is being displayed, the display apparatus 100 changes to an identifier of a different service provider in the same service category as the service provider of the identifier S2 on display.

As shown in FIG. 6, when the user clicks an up shift button 153 on the user input 150, an up shift instruction from the user input 150 is output to the display apparatus 100.

The display apparatus 100 changes to "Srch2" as an identifier S3 of a next service provider in the service category of the current service provider, that is, the content search service category, on display based on the up shift instruction from the user input 150.

In this state, when the up shift instruction is received again, the display apparatus 100 changes to an identifier of a next service provider on display.

In this way, an identifier of a service provider of a content related service may be displayed which corresponds to a shift instruction from the user input 150.

Figure 7:
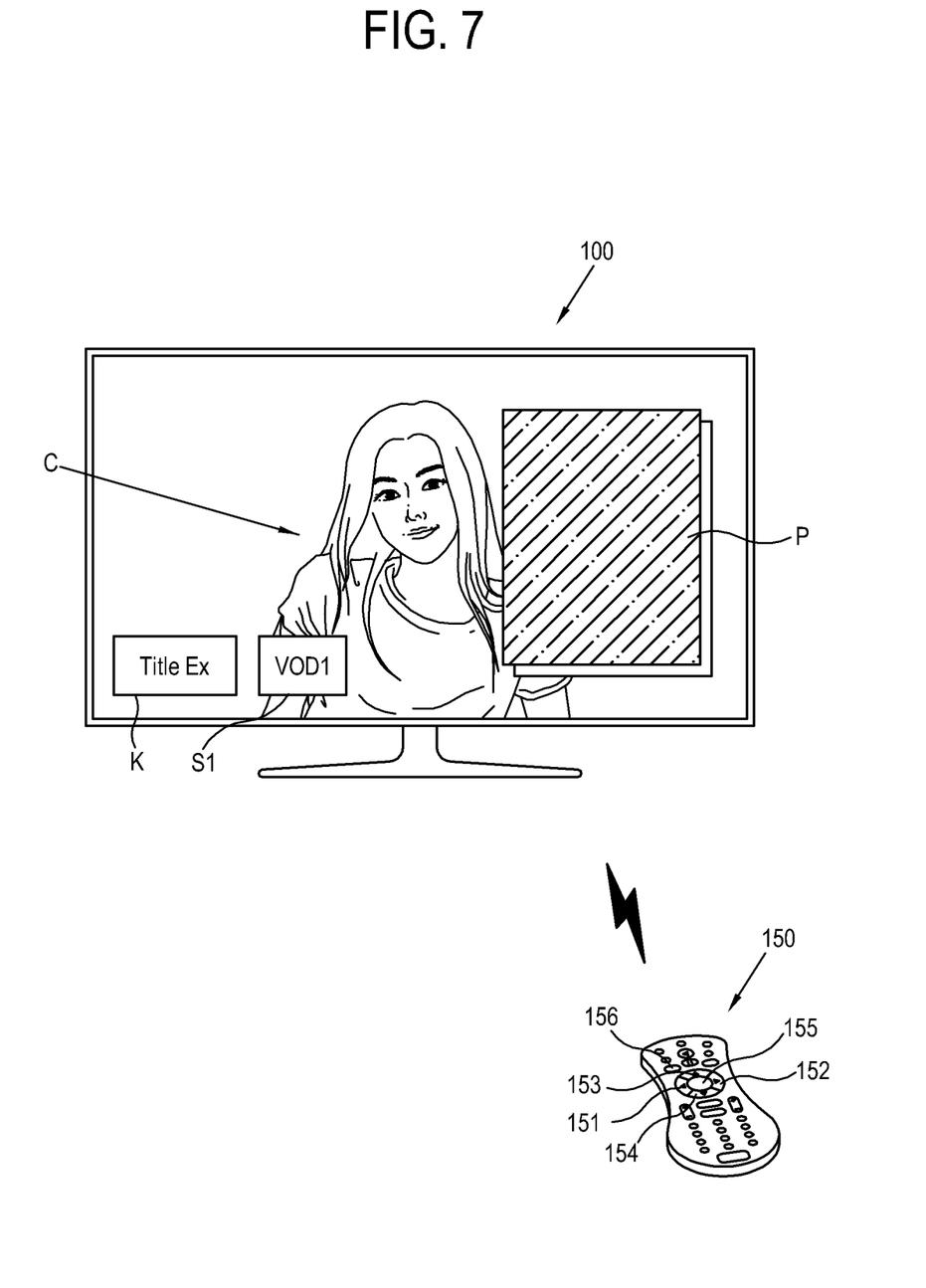
FIG. 7 illustrates a content related service image based on a keyword being displayed on the display apparatus of FIG. 1.

FIG. 7 illustrates a content related service image P based on a keyword K being displayed on the display apparatus 100.

As shown in FIG. 7, while a content image C, a keyword K, and a service identifier S1 are displayed on the display apparatus 100, a user clicks a decision/enter button 155 on the user input 150. Accordingly, the user input 150 outputs a decision instruction to the display apparatus 100.

The display apparatus 100 transmits "TitleEx" as information related to the keyword K currently displayed to the server 10, which provides a service of "VOD1" as the identifier S1 currently displayed, and requests the server 10 to provide a service based on the information related to the keyword K based on the decision instruction from the user input 150.

The server 10 provides a service image P based on the keyword K in response to the request from the display apparatus 100, and the display apparatus 100 displays the service image P provided from the server 10.

A service based on a keyword K may be provided by various ways based on a method that a service provider provides a service, without being particularly limited. For example, when "TitleEx" as a keyword K is received from the display apparatus 100, the server 10 providing a VOD service may retrieve a video related to "TitleEx" among various video contents stored therein and may provide the retrieved video to be displayed on the display apparatus 100.

Alternatively, when "TitleEx" as a keyword K is received from the display apparatus 100, the server 10 providing a SNS service may provide an image of collected reviews and opinions on "TitleEx" only from among reviews and opinions of a plurality of clients on various contents to be displayed on the display apparatus 100.

The service image P may be displayed by various methods. As shown in FIG. 7, the display apparatus 100 may display the service image P to overlap the content image C.

Alternatively, the display apparatus 100 may split an entire screen of the display 130 and display the content image C in one region and the service image P in another region. Also, the display apparatus 100 may display the service image P instead of the content image C, without displaying the content image C. In addition, the display apparatus 100 may display the service image on the entire screen, covering over the content image C.

Hereinafter, a method of controlling the display apparatus 100 will be described with reference to FIG. 8.

Figure 8:
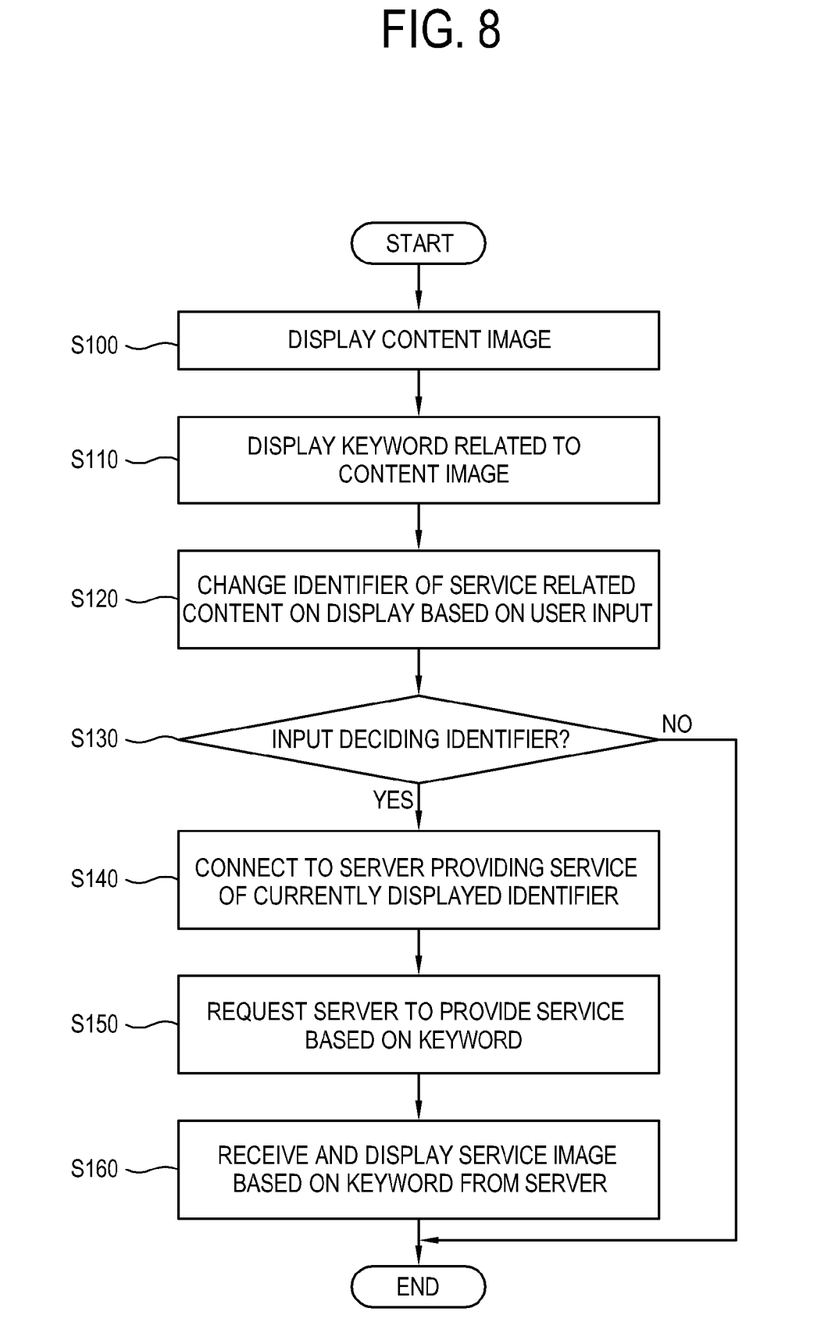
FIG. 8 is a flowchart illustrating a method of controlling the display apparatus of FIG. 1.

FIG. 8 is a flowchart illustrating the control method of the display apparatus 100.

As shown in FIG. 8, the display apparatus 100 displays a content image (S100). When a keyword creation event occurs, the display apparatus 100 displays a keyword related to the content image over the content image (S110).

In this state, the display apparatus 100 changes to an identifier of a content related service on display based on a user input (S120).

When an input for selecting a service identifier is made (S130), the display apparatus 100 connects to the server 10 providing a service of the currently displayed identifier (S140). The display apparatus 100 requests the server 10 to provide a service based on the keyword currently being displayed (S150).

The display apparatus 100 receives and displays an image of the service based on the keyword from the server 10 (S160).

According to this process, the display apparatus 100 enables the user to easily be provided with the service related to the content image.

The user may register in a bookmark a keyword related to each content while watching different content images. For example, when a keyword, displayed on the display apparatus 100 while watching a content image, is registered in a bookmark, the display apparatus 100 stores the keyword registered in the bookmark in the storage 160.

Then, when the user inputs an instruction to call the bookmark to the display apparatus 100 through the user input 150, the display apparatus 100 displays the keyword registered in the bookmark so that the user may browse or select the keyword. The user may use the content related service by using the displayed keyword in the bookmark.

Alternatively, the display apparatus 100 may further display a search box for inputting a keyword for retrieval in a service based on a preset input through the user input 150. The user may input the displayed keyword into the search box as is or through a slight modification of the keyword.

As described above, the display apparatus 100 extracts a keyword related to content from a content image. The display apparatus 100 may extract the keyword from metadata related to a content image signal, wherein metadata of one content may include various kinds of information, in addition to a title of the content, for example, a genre of the content, actors or actresses in the content, a production data/release data of the content, and brief/detailed information related to a story of the content.

Such metadata is accumulated over a predetermined time to form a use record, and the display apparatus 100 may obtain information relating to user preferences based on the use record.

For example, the display apparatus 100 may determine as a user favorite genre a genre of highest frequency in an accumulation of frequent metadata with respect to content genres. Alternatively, the display apparatus 100 may determine an actor of highest frequency in an accumulation of frequent information related to actors in content as a user favorite actor. Also, when a content image with a particular title is played back with high frequency, the display apparatus 100 may determine content with the title as user favorite content.

In this way, the information related to the user preferences is obtained based on frequency of metadata on content images accumulated over a predetermined period of time.

The display apparatus 100 provides the information related the user preferences to the content related service and is provided with a recommended service based on the information received from a service provider. For example, when information related to user preference for a movie is provided to the service provider, the display apparatus 100 may be provided with a service specializing in movies from the service provider.

Figure 9:
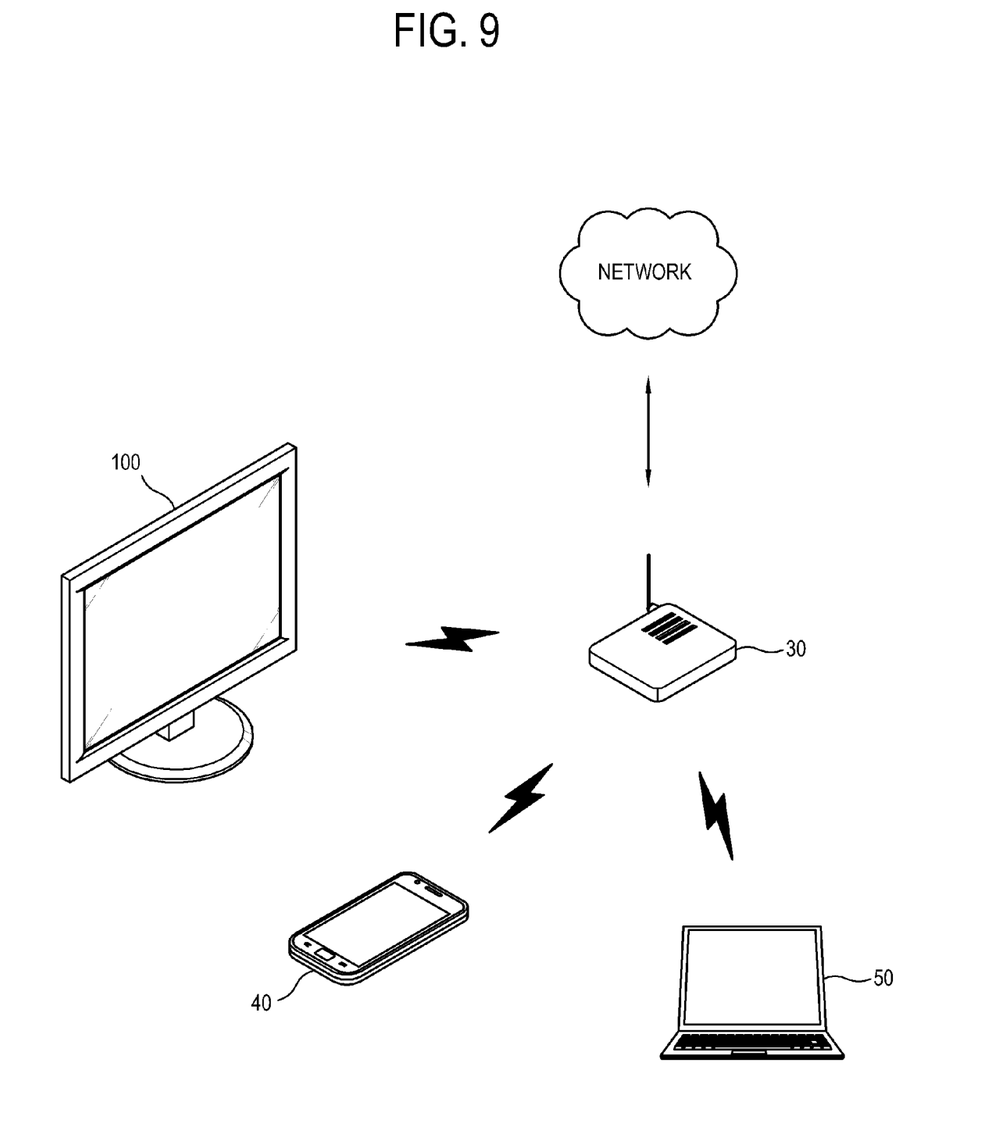
FIG. 9 illustrates a local area network system including a display apparatus according to a second exemplary embodiment.

FIG. 9 illustrates a local area network (LAN) system including a display apparatus, according to a second exemplary embodiment.

As shown in FIG. 9, the LAN system includes a gateway 30 connected to an external wide area network and a plurality of electronic devices 40, 50, and 100 connected to the gateway 30 via a cable or wirelessly for communications and communicating with the wide area network through the gateway 30.

In the present embodiment, the LAN system includes the gateway 30, a display apparatus 100, and two external devices 40 and 50, without being limited to the illustrated kinds and number of devices. Further, the external devices 40 and 50 may be configured as various display apparatuses or electronic devices, for example, a mobile phone and a computer. In an exemplary embodiment, the external devices 40 and 50 may be provided with a content related service for use in a similar manner as the display apparatus 100.

As described above, the user may accumulate user preference information through the display apparatus 100 and be provided with a content related service based on the user preference information through the display apparatus 100.

However, in the LAN system, such as a home network, users of the display apparatus 100 and the external devices 40 and 50 may often be the same person or family members having similar tastes or preferences. Thus, in a known method, when the user uses the external devices 40 and 50 while being provided with a service based on the user preference information through the display apparatus 100, the external devices 40 and 50 may not be provided with the service based on the user preference information, unlike the display apparatus 100, thereby causing inconvenience to the user.

Thus, according to an exemplary embodiment, the display apparatus 100 obtains the user preference information from a use record of content images displayed, played back, or executed on the display apparatus 100 over a predetermined period of time and periodically transmits the user preference information to the external devices 40 and 50. Accordingly, the external devices 40 and 50 may be provided with a content related service based on the user preference information, received from the service provider.

The external devices 40 and 50 may be provided with a content related service and may utilize the service by various method based on a configuration of the external devices 40 and 50, for example, the method illustrated with reference to the display apparatus 100 in the foregoing exemplary embodiment.

The use record may be accumulated in the display apparatus 100 over a given period, for example, a period from a point when the display apparatus 100 is used first to a current point, a specified period of time until a current time, for example, one year or two years or a period of time designated by the user.

Also, the display apparatus 100 may transmit the user preference information to the external devices 40 and 50 by various methods. For example, when an application for information exchange is installed on each of the display apparatus 100 and the external devices 40 and 50, an exclusive channel for information transmission is established between the devices with the application installed. Accordingly, the display apparatus 100 may transmit the user preference information to the external devices 40 and 50 having the application installed or activated through the exclusive channel.

Hereinafter, a method of controlling the display apparatus 100 and the external devices 40 and 50 according to an exemplary embodiment will be described with reference to FIG. 10.

Figure 10:
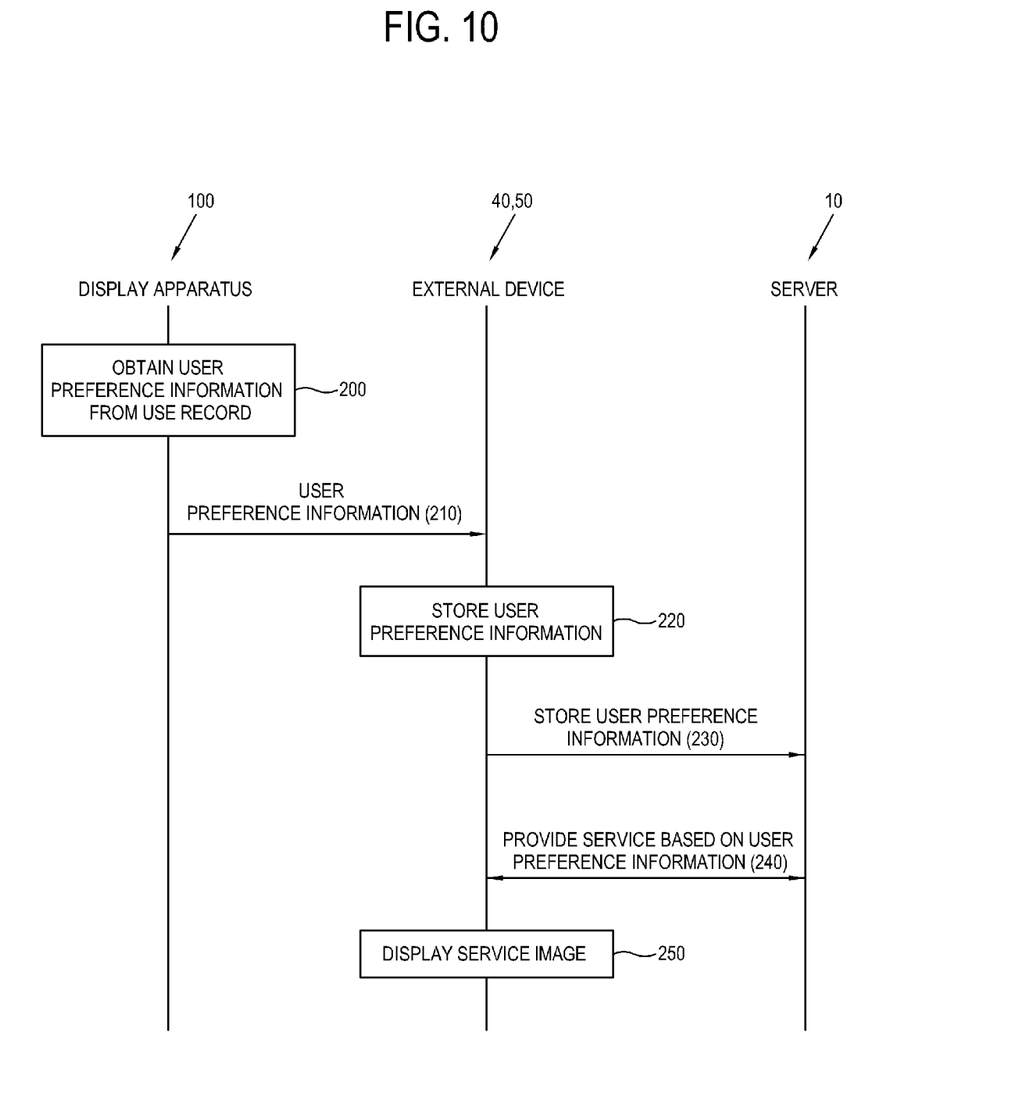
FIG. 10 is a flowchart illustrating a control method of the display apparatus of FIG. 9 and an external device.

FIG. 10 is a flowchart illustrating the method of controlling the display apparatus 100 and the external devices 40 and 50.

As shown in FIG. 10, the display apparatus 100 obtains user preference information from a use record (200). The display apparatus 100 transmits the user preference information to the external devices 40 and 50 (210).

The external devices 40 and 50 stores the user preference information received from the display apparatus 100 (220). Then, the external devices 40 and 50 provide the stored user preference information to the server 10 when making a request for a service from the server 10 which provides a content related service (230).

The server 10 provides a service based on the user preference information, received from the external devices 40 and 50, to the external devices 40 and 50 (240).

The external devices 40 and 50 display an image of the service provided from the server 10 (250).

According to this process, the user may be provided with the service based on user preferences through the external devices 40 and 50 in the same manner as the display apparatus 100.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a signal reception configured to receive an image signal of content;
a signal processor configured to process the image signal received by the signal reception according to a preset image processing process;
a display configured to display a content image based on the image signal processed by the signal processor;
a communicator configured to communicate with servers respectively providing services related to the content, the services respectively having identifiers; and
a controller configured to:
control the display to display, over the displayed content image, a keyword with a first identifier of a first service among the identifiers of the services, the first identifier being in a first category of services among categories of the services comprising at least one among a video on demand service, a content search service, a social networking service, and commerce;
control the display to change the displayed first identifier to a second identifier of a second service among the identifiers of the services, in response to a first user input for changing an identifier of a service, the second identifier being in the first category of services, and the first user input comprising one among a right instruction and a left instruction;
control the display to change the first category to a second category of services among the categories of the services, and change the displayed first identifier to a third identifier of a third service among the identifiers of the services, in response to a second user input for changing a category of services, the third identifier being in the second category of services, and the second user input comprising one among an up instruction and a down instruction; and
control the communicator to transmit the displayed keyword to a server, among the servers, providing a service corresponding to one among the first identifier, the second identifier, and the third identifier that is displayed, and receive the service, in response to a third user input for selecting an identifier of a service.

2. The display apparatus of claim 1, wherein each of the identifiers comprises a logo of a service provided.

3. The display apparatus of claim 1, wherein the keyword is displayed over the displayed content image, based on a fourth user input for displaying a keyword.

4. The display apparatus of claim 1, wherein the keyword comprises a title of the content image.

5. The display apparatus of claim 1, wherein the controller is further configured to obtain the keyword from metadata related to the content image.

6. The display apparatus of claim 1, wherein the communicator is further configured to communicate with at least one external device forming a local area communication network with the display apparatus, and
the controller is further configured to:
obtain user preference information from a record of usage of content images displayed on the display apparatus over a predetermined period of time; and
transmits the user preference information to the at least one external device on a preset cycle so that the external device is provided with the services related to the content based on the user preference information.

7. The display apparatus of claim 6, wherein the controller is further configured to obtain the user preference information based on an accumulation of frequency of metadata related to each of the content images.

8. The display apparatus of claim 7, wherein metadata of the content image comprises at least one among a title of the content image, a genre of the content image, and an actor in the content image.

9. A method of controlling a display apparatus, the method comprising:
displaying a content image;
displaying, over the displayed content image, a keyword with a first identifier of a first service among identifiers respectively of services related to the content image, the first identifier being in a first category of services among categories of the services comprising at least one among a video on demand service, a content search service, a social networking service, and commerce;
changing the displayed first identifier to a second identifier of a second service among the identifiers of the services, in response to a first user input for changing an identifier of a service, the second identifier being in the first category of services, and the first user input comprising one among an up instruction and a down instruction;

changing the first category to a second category of services among the categories of the services, and changing the displayed first identifier to a third identifier of a third service among the identifiers of the services, in response to a second user input for changing a category of services, the third identifier being in the second category of services, and the second user input comprising one among a left instruction and a right instruction; and transmitting the displayed keyword to a server, among the servers, providing a service corresponding to one among the first identifier, the second identifier, and the third identifier that is displayed, and receiving the service, in response to a third user input for selecting an identifier of a service.

10. The control method of claim 9, wherein each of the identifiers comprises a logo of a service provided.

11. The control method of claim 9, wherein the keyword is displayed over the displayed content image, based on a fourth user input for displaying a keyword.

12. The control method of claim 9, wherein the keyword comprises a title of the content image.

13. The control method of claim 9, further comprising obtaining the keyword from metadata related to the content image.

14. The control method of claim 9, further comprising:
obtaining user preference information from a record of usage of content images displayed on the display apparatus over a predetermined period of time; and
transmitting the user preference information to at least one external device forming a local area communication network with the display apparatus, on a preset cycle so that the external device is provided with the services related to the content image based on the user preference information.

15. The control method of claim 14, wherein the obtaining the user preference information comprises obtaining the user preference information based on an accumulation frequency of metadata of each of the content images.

16. The control method of claim 15, wherein metadata of the content image comprises at least one among a title of the content image, a genre of the content image, and an actor in the content image.

* * * * *